United States Patent [19]

Kurihara et al.

[11] Patent Number: 4,845,726
[45] Date of Patent: Jul. 4, 1989

[54] MAXIMUM LENGTH LINEARLY RECURRING SEQUENCE GENERATOR CONTROL DEVICE

[75] Inventors: Takao Kurihara; Masahiro Hamatsu, both of Tokyo, Japan

[73] Assignee: Clarion Co., Ltd., Tokyo, Japan

[21] Appl. No.: 70,486

[22] Filed: Jul. 7, 1987

[30] Foreign Application Priority Data

Jul. 11, 1986 [JP] Japan .................................. 61-163089

[51] Int. Cl.⁴ ...................... H04J 13/00; H03K 5/156
[52] U.S. Cl. ......................................... 377/33; 377/26; 370/18
[58] Field of Search ....................... 377/33, 26; 370/18

[56] References Cited

U.S. PATENT DOCUMENTS

3,944,858  3/1976  Petersson .............................. 377/33

Primary Examiner—John S. Heyman
Attorney, Agent, or Firm—Flynn, Thiel, Boutell & Tanis

[57] ABSTRACT

A control circuit such as a microcomputer sets only the starting address of the memory in which initial information for generating a maximum length recurring sequence is stored and the number of chips of the maximum length recurring sequence and the initial information for generating a maximum length recurring sequence is set from the memory in the maximum length recurring sequence generator by a hardware. The hardware for accessing the memory is constructed by a counter working with a high speed clock. The number of chips of the maximum length recurring sequence set by the external control circuit is counted by a counter working with a high speed clock.

6 Claims, 5 Drawing Sheets

MAXIMUM LENGTH LINEARLY RECURRING SEQUENCE GENERATOR CONTROL DEVICE

FIELD OF THE INVENTION

This invention relates to a maximum length linearly recurring sequence generator control device for digital data.

BACKGROUND OF THE INVENTION

As a prior art maximum length linearly recurring sequence generator (hereinbelow called M sequence generator) there is known that described in Japanese Publication No. 60-122071 filed June 5, 1985 by the same applicant.

However in the system described in that application, in which the initial information for the sequence generation is set in an M sequence generator using software by means of a microprocessor, the time necessry for the setting is determined by the processing speed of the microprocessor. For this reason, this system is not adequate for a system, for which the tolerable setting the time is limited.

OBJECT OF THE INVENTION

The object of this invention is to provide an M sequence generator control device, which can set the sequence generator with a high speed.

SUMMARY OF THE INVENTION

In order to achieve the above object, an M sequence generator control device according to this invention, comprises a memory in which initial information for generating an M sequence is stored; an M sequence generator; a control device for setting initial information necessary for generating an M sequence from the memory to the M sequence generator; and an external control circuit for setting the number of chips and the starting address in the memory of the M sequence in the control device. The control device includes a counter for memory access working with a high speed clock or a counter for counting the number of chips of the M sequence with a high speed clock.

Further this invention includes an M sequence generator control device, in which the control device comprises a clock generator synchronized with the clock pulse supplied to the M sequence generator; a strobe pulse generator generating a first strobe pulse for the M sequence generation; a counter load pulse generator; a strobe pulse generator generating a second and following strobe pulses; a sequence chip number counting section; a data number counting section for counting initial information for generating an M sequence; an address counting section for setting the starting address of the memory, in which the initial information for generating an M sequence is stored; and a counter control section for controlling counters in the data number counting section and the address counting section to be in the enable state of the disable state.

The initial information for generating a sequence $M_1$ from the set starting address is read out from the memory by using an initial counter load pulse given from the exterior and is set in a latch circuit within the M sequence generator. Then a strobe starting the M sequence generator is generated and the sequence $M_1$ is outputted. At the same time, the set number of sequence chips begins to be counted. Next the initial information for generating a sequence $M_2$ from the newly set starting address is read out from the memory and set in a latch circuit within the M sequence generator. At the same time as the termination of the count of the number of sequence chips, a strobe starting the $M_2$ sequence generator is generated and the sequence $M_2$ is outputted. At the same time, the newly set number of sequence chips begins to be counted. Subsequently the operations described above are repeated in order to generate an M sequence.

DETAILED DESCRIPTION

Figure 1:
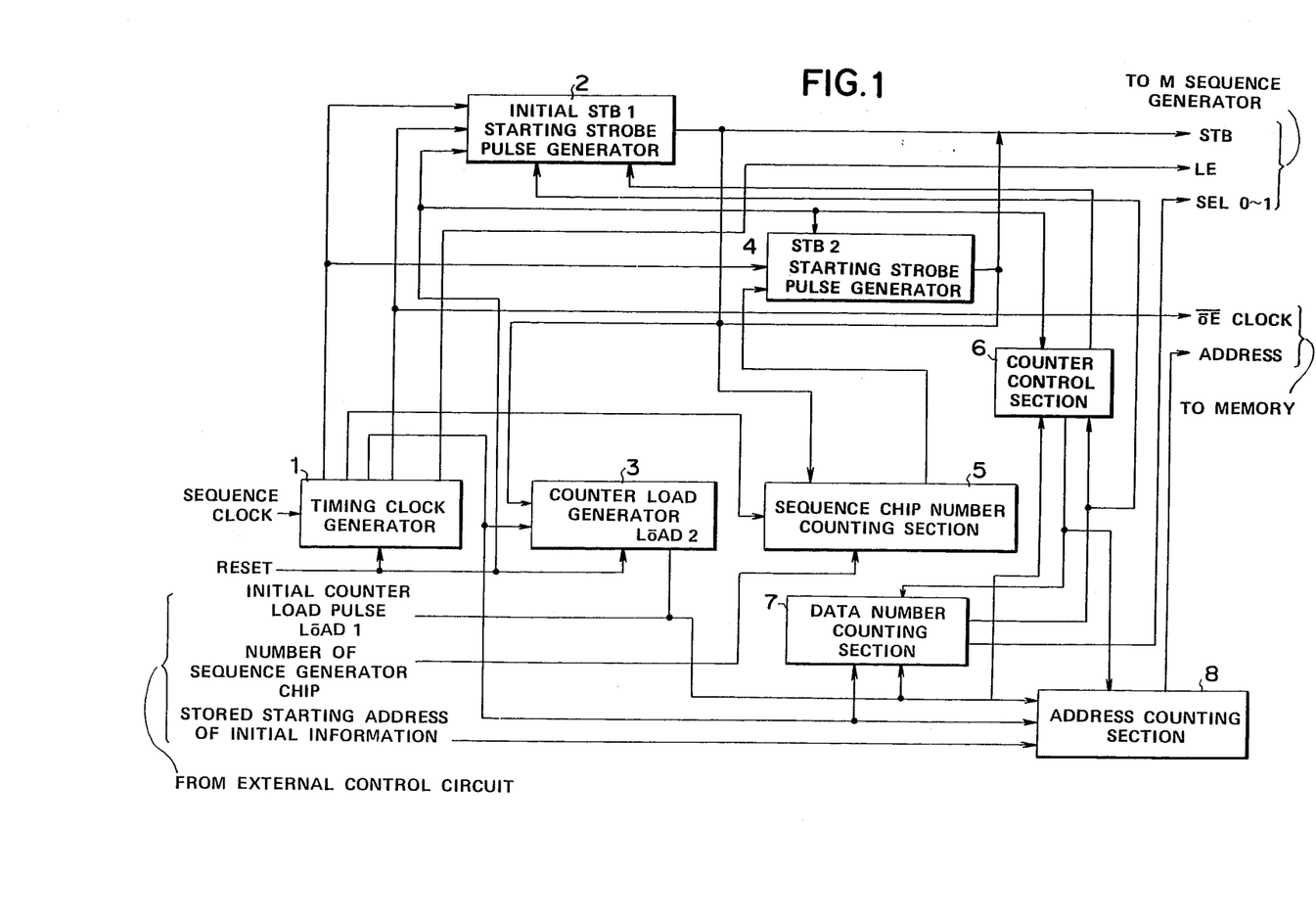
FIG. 1 is a block diagram illustrating the construction of the M sequence generator control device according to this invention.

FIG. 1 is a block diagram illustrating the construction of an embodiment of the M sequence generator control device (in this specification called simply control device) according to this invention, in which reference numeral 1 is a timing clock generating section synchronized with the clock pulse supplied to the M sequence generator for following blocks 2~8; 2 is a strobe pulse generating section working after having set the initial information for generating a first sequence given to the M sequence generator; 3 is a counter load pluse generating section for generating a second and following sequence working after the termination of the count of the number of sequence chips set in a sequence chip number counting section 5; 4 is a starting strobe pulse generating section for generating a second sequence working after the termination of the count of the number of sequence chips set in the sequence chip number counting section 5; 5 is the sequence chip number counting section permitting to set the number of sequence chips; 6 is a counter control section controlling counters in a data number counting section 7 and an address counting section 8 to be in the enable state or in the disable state; 7 is the data number counting section counting the number of the initial information for generating the sequence; and 8 is the address counting section permitting to set the starting address of the memory, in which the initial information for generating the sequence is stored. An external control circuit not shown in the figure sets the number of sequence chips, the starting address and the first counter load pulse.

After a power-on and a reset and before starting the device indicated in FIG. 1, it is necessary for the external control circuit to set the number of sequence chips in the sequence chip number counting section 5 and the starting address of the memory, in which the initial information necessary for generating the sequence is stored, in the address counting section 8 in FIG. 1.

Figures 4, 6:
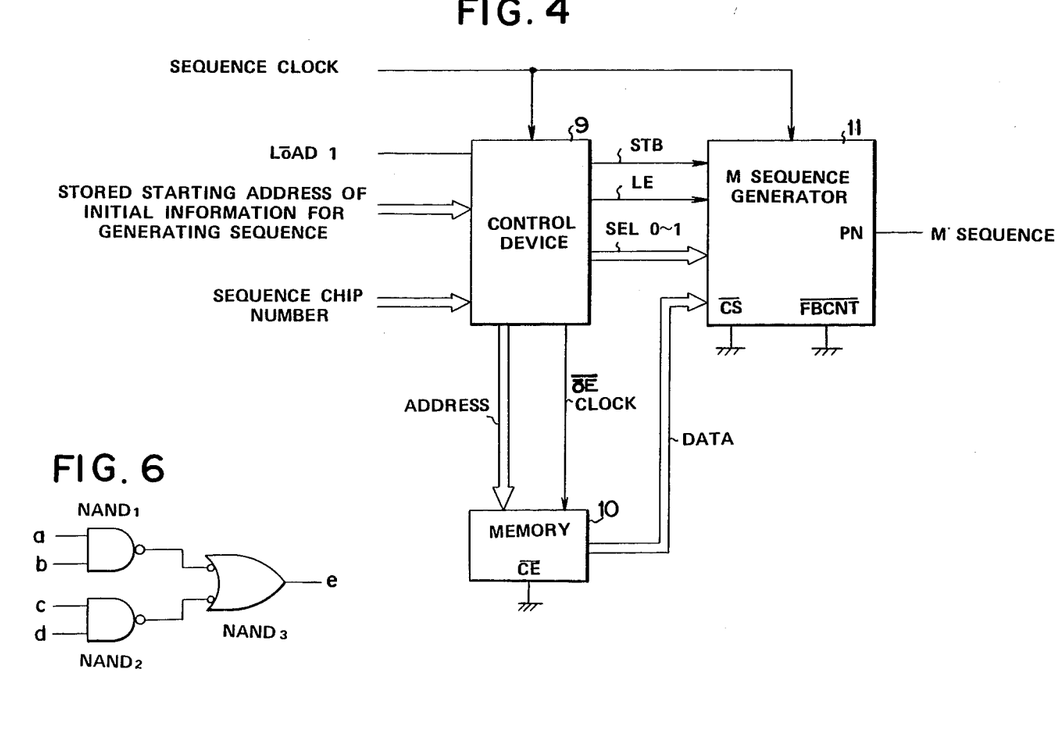
FIG. 4 is a block diagram illustrating an embodiment of the M sequence generator control device according to this invention.
FIG. 6 shows an example of the construction of a steering gate circuit.
Figure 5:
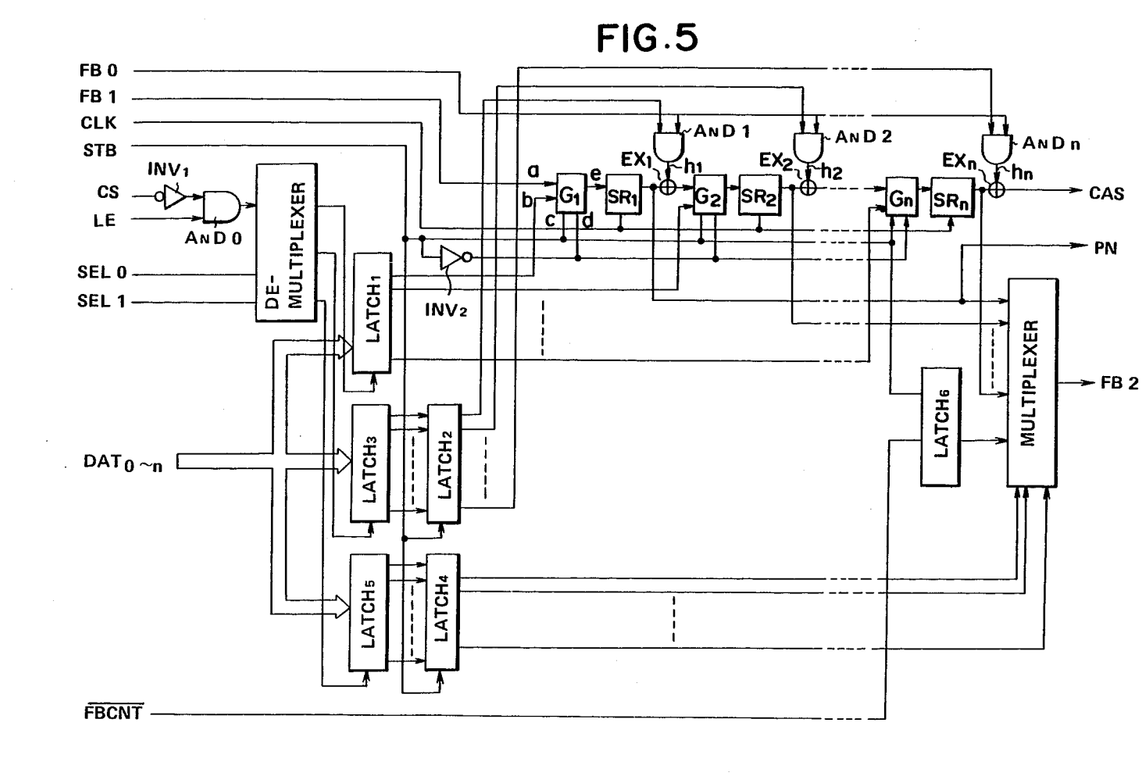
FIG. 5 is a block diagram illustrating an M sequence generator, which is the object of this invention.

FIG. 5 is a block diagram illustrating an M sequence generator, which is the object of this invention, in which $L_1 \sim L_6$ represent latches; MPX is a multiplexer circuit; DE-MPX is a demultiplexer circuit; $G_1 \sim G_n$ are steering gate circuits; AND 0~AND n are AND gates; SR 1~SR n are flipflop circuits; $EX_1 \sim EX_\eta$ are exclusive OR gates; and $INV_1$ and $INV_2$ are inverter circuits. A steering gate $G_1 \sim G_\eta$ is constructed by NAND circuits NAND 1~NAND 3 as indicated in FIG. 6. As initial information necessary for the generation of the sequence in the M sequence generator indicated in FIG. 5 there are the follwing information (i)~(iii); (i) the intial state of the flipflops SR 1~SR n, (ii) the feedback state, and (iii) the last stage selection state for the flipflops.

In FIG. 5 CLK represents a supplied clock; STB a sequence exchange strobe; CS a chip select; LE a latch enable; DAT 0~n data (i)~(iii) as stated above; and SEL 0~1 data selects, which selects data (i)~(iii) e.g. as indicated in Table 1. Further, FB 0~2 and CAS are the input and the output terminals for the cascade connection, respectively; FB 2 is a three state output; and PN represents the M sequence output.

TABLE 1

| SEL 1 | SEL 0 | Data |
|---|---|---|
| L | L | (i) |
| L | H | (ii) |
| H | L | (iii) |
| H | H | Meaningless |

Figure 2:
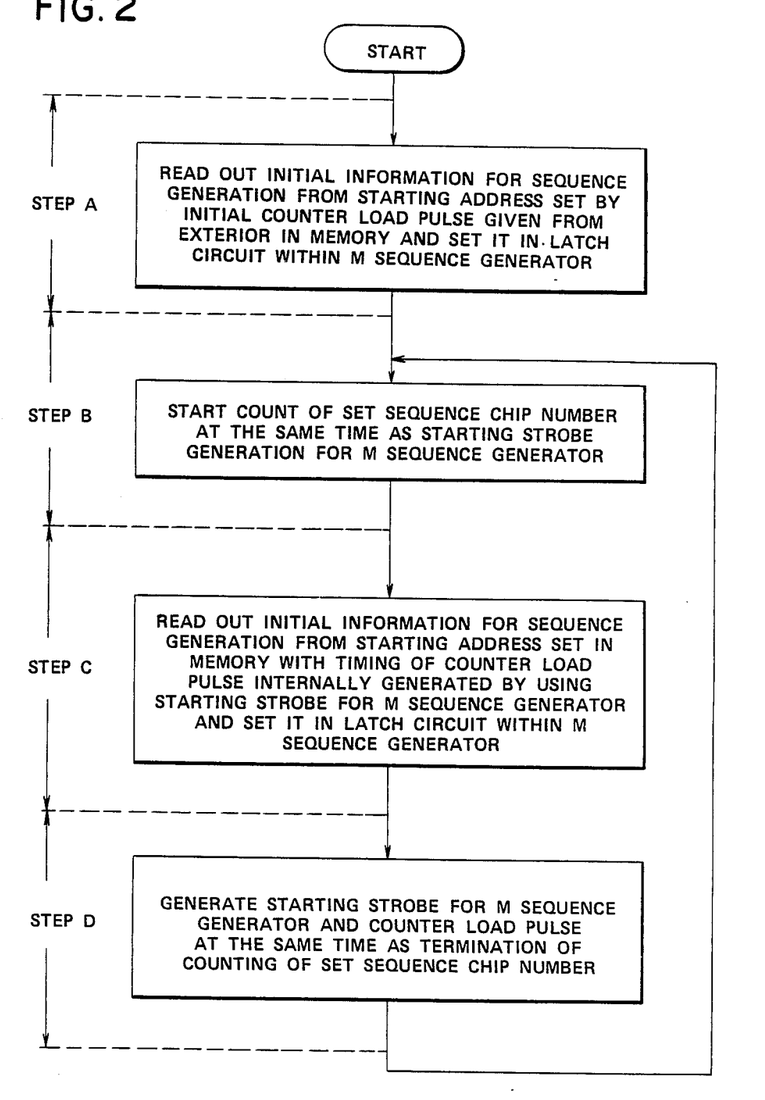
FIG. 2 is a flow chart for explaining the working mode of the control device indicated in FIG. 1.

FIG. 2 is a flow chart for explaining the working mode of the control device indicated in FIG. 1. The external control circuit gives a first counter load pulse LOAD 1 to the counter control section 6, the data number counting section 7 and the address counting section 8 indicated in FIG. 1 after having set the starting address of the memory.

The counter control section 6 indicated in FIG. 1 controls the data number counting section 7 and the address counting section 8 to be in the enable state by using this counter load pulse LOAD 1 as a trigger and thē address counting section 8 indicated in FIG. 1 accesses the memory, based on the starting address set previously, to read out successively the data (i)~(iii) as stated above.

Next the ltch enable pulse LE controlled by the demultiplxer control signals SEL 0~1 generated by the data number counting section 7 sets the data (i)~(iii) one after another in the latch circuits L, $L_3$ and $L_5$ within the M sequence generator as indicated in FIG. 5.

Further the data number counting section 7 counts the data (i)~(iii). After the termination of the count it sends a count termination signal to the counter control section 6, which controls the data number counting section 7 and the address counting section 8 to be in the disable state. (FIG. 2 "STEP A")

The signal representing the termination of the count of the data (i)~(iii) generated by the data number counting section 7 is sent also to the initial strobe generating section 2, which generates a strobe pulse STB 1 by using this signal as the trigger.

Consequently the M sequence generator as indicated in FIG. 5 generates a sequence on the basis of the initial information set by the strobe pulse STB 1.

Further, in the sequence chip number counting section 5, the number of sequence chips previously set begins to be counted, using the strobe pulse STB 1 as the trigger. (FIG. 2 "STEP B")

The counter load pulse generating section 3 for generating second and following sequences produces the second and following counter load pulses LOAD 2, using the strobe pulse STB 1 generated by the initial strobe pulse generating section 2 as the trigger. The same operation as that in "STEP A" is repeated, using the counter load pulse LOAD 2 as the trigger. (FIG. 2 "STEP C")

The sequence chip number counting section 5 sends a signal representing the termination of the count of the number of sequence chips to the second and following strobe pulse generating section 4 after the termination of the count, which is set at first, and the second and following strobe pulse generating section 4 generates second and following strobe pulses STB 2, using the signal as the trigger.

Thereafter the second and following counter load pulse generating section 3 generates the counter load pulse LOAD 2, using the strobe pulse STB 2 as the trigger. (FIG. 2 "STEP D")

Therefore, subsequently, the operations "STEP B" and "STEP C" are repeated, using the strobe pulse STB 2 generated at "STEP D" and the counter load pulses LOAD 2 as the trigger.

Figure 3:
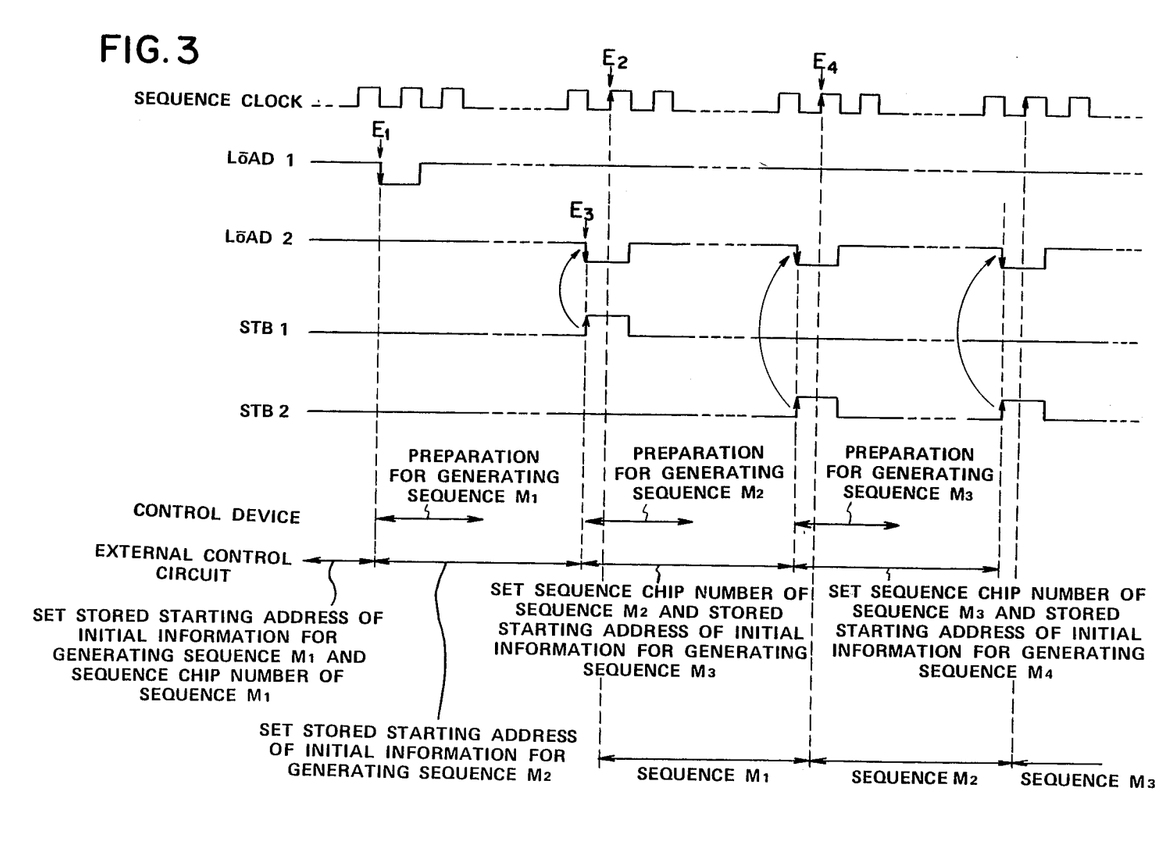
FIG. 3 is a timing chart for explaining the working mode of the control device indicated in FIG. 1.

FIG. 3 is a timing chart showing the timing for changing over the kind of sequences.

(1) At first, the external control circuit sets the starting address of the memory, in which the initial information for generating the sequence $M_1$ is stored and the number of chips for generating the sequence $M_1$ and, after the termination of the setting, outputs the counter load pulse LOAD 1. The control device carries out the preparation for generating the sequence $M_1$, using the counter load pulse LOAD 1 as the trigger. (FIG. 3 $E_1$)

(2) When the control device carries out the preparation for generating the sequence $M_1$, the external control circuit sets the starting address of the memory, in which the initial information for generating the sequence $M_2$ is stored.

(3) After the preparation for generating the sequence $M_1$ has been terminated, the strobe pulse STB 1 is generated and the M sequence generator produces the sequence $M_1$. (FIG. 3 $E_2$)

(4) The control device carries out the preparation for generating the sequence $M_2$, using the second and following counter load pulse LOAD 2 as the trigger, which is in turn generated by using the strobe pulse STB 1 as the trigger. (FIG. 3 $E_3$)

(5) When the control device carries out the preparation for generating the sequence $M_2$, the microprocessor sets the number of chips for generating the sequence $M_2$ and the starting address of the memory, in which the initial information for generating the sequence $M_3$ is stored.

(6) After the termination of the count of the number of sequence chips for generating the sequence $M_1$, the second and following strobe pulse STB 2, which is generated after the termination of the count of the number of sequence chips, is generated, and the M sequence generator produces the sequence $M_2$. (FIG. 3 $E_4$)

Thereafter, concerning the sequence $M_3$, the operations described above are effected, using the strobe pulse STB 2 as the trigger. In this way, it is possible to change over different sequences one after another by means of the device according to this invention.

FIG. 4 is a block diagram illustrating an embodiment of the M sequence generator control device according to this invention, in which reference numeral 9 is a control device; 10 is a memory, 11 is an M sequence generator indicated in FIG. 5; $\overline{OE}$ clock represents an output enable clock; and $\overline{CE}$ represents a chip enable.

In this embodiment it is possible to realize the setting of the initial information to the M sequence generator during a period of time shorter than several μ sec.

As an application, the control device according to this invention can be used advantageously for an M sequence generator, in which the M sequence coming from the sender side and the M sequence produced at the receiver side can be changed arbitrarily in their kind and phase on the sender and receiver sides, in the spread spectrum communication system using M sequence generators, by which desired information transmission is effected by using correlation output therebetween.

As explained above, according to this invention, it is possible to realize an M sequence generator control device, by which it is possible to set the initial information for generating sequences with a high speed in an M sequence generator.

While particular embodiments of the invention have been shown and described, it will be obvious to those skilled in the art that various changes and modifications may be made without departing from the present invention in its broader aspect.

The embodiments of the invention in which an exclusive property or privilege is claimed are defined as follows:

1. A maximum length linearly recurring sequence generator control device comprising:
   a memory in which initial information for generating a maximum length recurring sequence having a predetermined number of chips is stored;
   a maximum length linearly recurring sequence generator;
   a control device for loading initial information necessary for generating a maximum length recurring sequence from said memory into said maximum length linearly recurring sequence generator; and
   an external control circuit for loading said number of chips for and a starting address in said memory of said initial information for the maximum length linearly recurring sequence into said control device;
   wherein said control device includes:
   (a) a clock generator synchronized with a clock pulse supplied to said maximum length linearly recurring sequence generator;
   (b) a strobe pulse generator generating a first strobe pulse for the maximum length recurring sequence generation;
   (c) a counter load pulse generator;
   (d) a strobe pulse generator generating second and following strobe pulses;
   (e) a sequence chip number counting section;
   (f) a data number counting section for counting initial information for generating a maximum length linearly recurring sequence;
   (g) an address counting section for setting the starting address in the memory at which the initial information for generating a maximum length recurring sequence is stored; and
   (h) a counter control section for controlling counters in said data number counting section and said address counting section to be in an enable state or a disable state.

2. A maximum length linearly recurring sequence generator control device, comprising:
   a memory which stores initial information for generating at least one maximum length linearly recurring sequence having a predetermined number of chips;
   a maximum length linearly recurring sequence generator;
   control device means for loading initial information necessary for generating a maximum length recurring sequence from said memory into said maximum length linearly recurring sequence generator; and
   external control circuit means for loading the number of chips for and a starting address in said memory of the initial information for a maximum length linearly recurring sequence into said control device means;
   wherein said control device means includes:
   first means for generating a starting load signal in response to a signal supplied by said external control circuit, and second means responsive to said starting load signal for reading out initial information from said memory and loading it into said maximum length linearly recurring sequence generator and for thereafter producing a starting probe signal which causes said sequence generator to generate a sequence from such initial information;
   third means for counting the number of chips in the generated sequence following said starting probe signal for said maximum length linearly recurring sequence generator;
   fourth means for generating a further starting load signal in response to said starting strobe signal, said second means being responsive to said further starting load signal from said fourth means for reading out initial information from said memory and loading it into said maximum length linearly recurring sequence generator; and
   fifth means responsive to said third means for generating said starting strobe signal again in response to completion by said third means of counting of said predetermined number of chips.

3. A maximum length linearly recurring sequence generator control device according to claim 2, wherein said second means includes a counter containing a memory address and clocked with a high speed clock.

4. A maximum length linearly recurring sequence generator control device according to claim 2, wherein said third means includes a counter which counts the number of chips of the maximum length linearly recurring sequence and is clocked with a high speed clock.

5. An apparatus comprising: a memory which has address inputs and address outputs and which stores a plurality of sets of initialization data; addressing means for applying memory addresses to said address inputs of said memory in a manner causing said memory to produce at its data outputs a predetermined series of said data sets; sequence generator means for accepting each said data set from said data outputs of said memory and for generating based thereon a respective sequence which is a predetermined number of chips in length; chip number supplying means for successively producing for each said data set in said series a value representing said predetermined number of chips in the corresponding sequence, said values being produced in an order corresponding to the order in said series of the corresponding data sets; chip mounting means cooperable with said count supplying means for maintaining a count of the chips in each said sequence generated by said generator means and, in respone to said count reaching the predetermined number of chips for each respective sequence, for causing said generator means to immediately terminate the sequence being generated based on one of said data sets in said series and to immediately initiate sequence generation based on the next successive data set in said series.

6. An apparatus of claim 5, wherein each said data set is stored in a predetermined number of words in said memory, and wherein said addressing means includes a memory address counter having its outputs coupled to said address inputs of said memory, a word counter for counting said predetermined number of words in each said data set addressed by said address counter, and counter control means for selectively enabling and disabling said address counter and said word counter.

* * * * *

UNITED STATES PATENT AND TRADEMARK OFFICE
CERTIFICATE OF CORRECTION

PATENT NO. : 4 845 726

DATED : July 4, 1989

INVENTOR(S) : Takao KURIHARA et al

It is certified that error appears in the above-identified patent and that said Letters Patent is hereby corrected as shown below:

Column 6, line 20; after "circuit" insert ---means---.

line 24; change "probe" to ---strobe---.

line 28; change "probe" to ---strobe---.

line 52; change "address" (second occurrence) to ---data---.

line 66; change "mounting" to ---counting---.

line 67; change "count" to ---chip number---.

Column 7, line 1; change "respone" to ---response---.

Signed and Sealed this

Twenty-second Day of May, 1990

Attest:

HARRY F. MANBECK, JR.

*Attesting Officer*  *Commissioner of Patents and Trademarks*